United States Patent
Barenbrug

(10) Patent No.: US 8,059,133 B2
(45) Date of Patent: Nov. 15, 2011

(54) GRAPHICS PIPELINE FOR RENDERING GRAPHICS

(75) Inventor: Bart Gerard Bernard Barenbrug, Waalre (NL)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 558 days.

(21) Appl. No.: 11/579,357

(22) PCT Filed: Apr. 29, 2005

(86) PCT No.: PCT/IB2005/051404
§ 371 (c)(1),
(2), (4) Date: Aug. 15, 2008

(87) PCT Pub. No.: WO2005/106798
PCT Pub. Date: Nov. 10, 2005

(65) Prior Publication Data
US 2009/0167776 A1    Jul. 2, 2009

(30) Foreign Application Priority Data
May 3, 2004    (EP) .................................... 04101890

(51) Int. Cl.
*G09G 5/00* (2006.01)
(52) U.S. Cl. ...................................... 345/586; 345/582
(58) Field of Classification Search .................. 345/552, 345/506
See application file for complete search history.

(56) References Cited

U.S. PATENT DOCUMENTS

| | | | |
|---|---|---|---|
| 5,831,640 A * | 11/1998 | Wang et al. ................... | 345/552 |
| 5,903,270 A * | 5/1999 | Gentry et al. ................. | 345/419 |
| 5,905,500 A | 5/1999 | Kamen et al. | |
| 7,158,141 B2 * | 1/2007 | Chung et al. .................. | 345/506 |
| 2002/0118213 A1 * | 8/2002 | Yoshioka et al. ............. | 345/606 |
| 2004/0012603 A1 * | 1/2004 | Pfister et al. .................. | 345/582 |
| 2004/0100474 A1 * | 5/2004 | Demers et al. ................ | 345/582 |
| 2004/0160453 A1 * | 8/2004 | Horton et al. ................. | 345/582 |

(Continued)

FOREIGN PATENT DOCUMENTS

CN    1191352    8/1998

(Continued)

OTHER PUBLICATIONS

Microsoft Developer Network, "Texture Filtering (Direct3D 9")", http://msdn.microsoft.com/en-us/library/bb206250(v=VS.85).aspx.*

(Continued)

*Primary Examiner* — Xiao Wu
*Assistant Examiner* — Phi Hoang
(74) *Attorney, Agent, or Firm* — DLA Piper LLP (US)

(57) ABSTRACT

A graphics pipeline (20) for rendering graphics receives texture data (22) and vertex data (23). The texture data (22) define rectangular texture maps (24), which are axis-aligned in texture space. The vertex data (23) describe output quadrilaterals (25) in screen space. A rasterizer (27) rasterizes the input rectangle (24) by determining which texels are inside the input rectangle (24). A mapper (28) maps the texels inside the input rectangle (24) onto the output quadrilaterals (25). The mapping is performed by calculating screen space output coordinates from the texture space grid coordinates of the texels. For the calculation an equation is used comprising at least one linear combination of the texture space grid coordinates of the texels inside the input rectangles (24) and at least one product of real powers of the texture space grid coordinates of the texels inside the input rectangles (24).

20 Claims, 6 Drawing Sheets

U.S. PATENT DOCUMENTS

| | | | |
|---|---|---|---|
| 2004/0239672 A1* | 12/2004 | Schmidt | 345/426 |
| 2005/0046628 A1* | 3/2005 | Hux et al. | 345/420 |
| 2005/0128209 A1* | 6/2005 | Meinds et al. | 345/582 |

FOREIGN PATENT DOCUMENTS

| | | |
|---|---|---|
| EP | 1376472 | 1/2004 |
| JP | 2001-501349 | 1/2001 |
| JP | 2002-520748 | 7/2002 |
| JP | 2005-516313 | 6/2005 |
| JP | 2005-516314 | 6/2005 |
| WO | WO 99/06957 | 2/1999 |
| WO | WO 00/04505 | 1/2000 |
| WO | WO 02/43002 | 5/2002 |
| WO | WO 02/103633 | 12/2002 |
| WO | WO 03/065307 | 8/2003 |
| WO | WO 03/065308 | 8/2003 |
| WO | WO 03/081537 | 10/2003 |
| WO | WO 03/105482 | 12/2003 |

OTHER PUBLICATIONS

Electronic File Wrapper of EP Application No. 20050731766, filed Apr. 29, 2005, published as EP1745440A1, published date Jan. 24, 2007 (prosecution of related EP application, issuing as EP1745440B1 listed above), electronically captured from EPO Database on Apr. 5, 2011.

Barenbrug, B.: "Pixel Shading and Forward Texture Mapping", International Workshop on Vision, Modeling and Visualization; Proceedings, Nov. 19, 2003; pp. 345-353.

Chen, B. et al.: "Forward Image Mapping", Institute of Electrical and Electronics Engineers; Proceedings Visualization '99, San Francisco, CA; Oct. 24-29, 1999; Annual IEEE Conference on Visualization, Los Almitos, CA: IEEE Comp. Soc, US Oct. 24, 1999; pp. 89-96.

Ghazanfarpour, D. et al.: "A High-Quality Filtering Using Forward Texture Mapping", Computers and Graphics, Pergamon Press Ltd., Oxford, GB, vol. 15, No. 4, Jan. 1991, pp. 569-577.

Meinds, Koen et al.: "Resample Hardware for 3D Graphics", Eurographics Workshop on Graphics Hardware; Proceedings of the ACM Siggraph/Eurographics Conference on Graphics Hardware; Eurographics Association, 2002; pp. 17-27.

Japanese Decision of Rejection, issued Mar. 4, 2011 in counterpart Japanese application, as well JP Office Action issued on Oct. 8, 2010 (English translation unavailable) 5 pages.

* cited by examiner

GRAPHICS PIPELINE FOR RENDERING GRAPHICS

CROSS-REFERENCE TO RELATED APPLICATION(S)

This 371 application claims the priority benefits of PCT International Application PCT/IB2005/51404, filed Apr. 29, 2005, which claims priority to European Application No. 04101890.4, filed May 3, 2004.

FIELD OF THE INVENTION

The invention relates to a graphics pipeline for rendering graphics, the graphics pipeline comprising an input for receiving texture data and vertex data, the texture data defining texture maps in a texture space, each texture map comprising texels associated with texture space grid coordinates, the vertex data comprising texture space input coordinates of input polygons and screen space input coordinates of output polygons, each one of the input polygons being associated with a corresponding one of the output polygons, a rasterizer for receiving the texture space input coordinates of the input polygons and for providing the texture space grid coordinates of the texels inside the input polygons, and a mapper for mapping the texels inside the input polygons onto the output polygons, the mapping being performed by calculating screen space output coordinates from the texture space grid coordinates of the texels inside the input rectangles. Herein, a texel is a texture element.

The invention further relates to a method for rendering graphics to be displayed on a display, to a computer and to a device for displaying graphics.

BACKGROUND OF THE INVENTION

Texture mapping is a core technology of current 3D graphics systems. Such graphics systems are used for graphics applications like 3D computer games for personal computers or gaming consoles, such as the Nintendo Game Cube, the Sony Playstation and the Microsoft Xbox. With texture mapping, the geometry of a 2D representation of 3D objects is provided with texture. As a result the shape as well as the colors of the on-screen graphics realistically resemble the 3D objects. Two techniques are often used for texture mapping, inverse texture mapping (ITM) and forward texture mapping (FTM). With ITM the pixels are traversed in screen space and a mapper maps the pixel grid coordinates to texel coordinates. The intensity of the mapped texel coordinate is determined by weighting texel intensities stored in a texture memory and occurring at texel grid positions surrounding a texel coordinate. With FTM screen space positions are calculated from the texture grid coordinates. The intensities at the screen space positions are distributed over surrounding screen space grid positions and the distributed intensities at the screen space grid positions are stored in an image buffer. The graphics pipeline according to the invention is based on the FTM technique.

A typical 3D FTM graphics pipeline comprises an input for receiving texture data and graphics data, a texture memory to store the texture data, a rasterizer to rasterize input polygons in texture space and a mapper to map the texture onto the screen. The texture data defines texture maps, each texture map comprises an array of texels, each texel being associated with texture space grid coordinates and a texture color. The vertex data comprises texture space input coordinates that define the vertices of input polygons and screen space input coordinates that define the vertices of output polygons. The output polygons constitute a geometry of a 2D representation of 3D objects. Each input polygon is associated with a corresponding output polygon. The 2D representation is used to be displayed on a display screen and represents a perspective view on the 3D objects from a certain viewpoint. The texture memory stores the texture data. A rasterizer receives the texture space input coordinates of the input polygons and provides the texture space grid coordinates of the texels inside the input polygons. The texture space input coordinates that are the vertices of the input polygons need not be positioned on grid positions. A mapper maps the texel colors and coordinates onto the output polygons. The mapping is performed by calculating screen space output coordinates from the texture space grid coordinates. The screen space output coordinates are generally not on pixel grid positions in the screen space. Often a screen space resampler is used for splatting a color of the mapped texture space grid coordinate over the pixel grid positions surrounding the screen space output coordinates.

Known FTM graphics systems use perspective mapping for mapping polygons in texture space to polygons in screen space. An example of a perspective mapping is shown in FIG. 1. In screen space 5 a perspective projection of a pyramid is shown. In the real world the pyramid is formed by four triangles on a square base, of which only three triangles can be seen from the viewpoint defining the 2D representation in screen space 5. The texture space 4 comprises the texture of the three triangles 1, 2 and 3 visible in the screen space representation. The triangles 1, 2 and 3 in the 2D texture space 4 are equal to the triangles in the 3D world space (not shown) as seen from a viewing direction normal to the triangles. Each triangle in texture space 4 undergoes a different transformation, depending on its orientation in world space relative to the viewing plane (=screen space 5). In this event, the shape of one triangle 2, in world space is parallel to the viewing plane 5, and the shape of the texture of this triangle 2 is preserved in the 2D representation. The perspective projection of the pyramid onto the screen space 5 results in transformation of two triangles 1 and 3 into differently shaped triangles. The texture on these two triangles 1 and 3 is also transformed, because all texels inside the triangles 1 and 3 are transformed together with the triangles 1 and 3 itself. The result of the perspective projection shown in FIG. 1 is that the polygons in texture space are transformed to a 2D representation of the same triangles, as seen from a viewing direction, not being normal to the viewing plane 5.

The general form of the perspective mapping used in 3D graphics is:

$$\begin{pmatrix} x_c^h \\ y_c^h \\ w_c^h \end{pmatrix} = \begin{pmatrix} A & B & C \\ D & E & F \\ G & H & I \end{pmatrix} \begin{pmatrix} u_g \\ v_g \\ 1 \end{pmatrix} \quad (1)$$

where the h indicates that these are homogeneous coordinates which still have to undergo division by the third coordinate ($w_c^h$) to arrive at the actual screen space-output coordinates $x_c$ and $y_c$. $u_g$ and $v_g$ are the texture space grid coordinates of the texels to be mapped. Homogeneous coordinates are used to split the non-linear perspective projections into easy-to-implement linear operations and one division. The mapper first calculates the mapping coefficients A-I, using the texture space input coordinates of input polygons and screen space input coordinates of output polygons. Because all polygons in world space have a different orientation relative to the viewing plane 5, the mapping coefficients are different for different polygons. When the mapping coefficients are known, all texels inside the polygon are mapped onto the output polygons.

A drawback of the graphics system described above is the complexness and the expensiveness of the rasterizer. The input polygons may, for example, be triangles, quadrilaterals or pentagons, defined by the texture space coordinates of its vertices. For determining which texels are inside the polygon, the rasterizer first has to determine the edges of the polygon. Then it can be determined which texels are inside the polygon and are to be further processed. For the edge calculation a complex and expensive rasterizer is required. As a consequence, such a rasterizer is not suitable for low budget graphics systems. Such low budget systems are desired for adding 3D graphics technology to, for example, televisions and cellular phones.

SUMMARY OF THE INVENTION

It is an object of the invention to provide a system for rendering graphics to be displayed on a display, the system comprising a less complex and less expensive rasterizer.

The invention is defined by the independent claims. The dependent claims define advantageous embodiments.

To meet the object of the invention a rasterizer is provided, which only has to rasterize axis-aligned rectangles. Axis-aligned rectangles can be defined by just two coordinate pairs. No complex edge calculations are required for rasterizing these axis aligned rectangles. The texels inside an axis-aligned rectangle can easily be processed, for example, line by line by using the following sample code:

```
For i=v_r1 to v_r2
    For j=u_r1 to u_r2
        Process (j,i)
        j=j+1
    End For
    i=i+1
End For
``` where $u_{r1}$ and $v_{r1}$ are the coordinates of the first coordinate pair defining the axis-aligned rectangle and $u_{r2}$ and $v_{r2}$ are the coordinates of the second coordinate pair defining the axis-aligned rectangle.

In the graphics pipeline according to the invention, a mapper maps the texels, inside the input rectangles onto output quadrilaterals, by calculating screen space output coordinates from the texture space grid coordinates of the texels. The screen space output coordinates are calculated using a mapping function comprising at least one linear combination of the texture space grid coordinates of the texels inside the input rectangles and at least one product of real powers of the texture space grid coordinates of the texels inside the input rectangles.

The real powers can be natural powers. Also, the natural powers can be equal to one.

The mapping function used by the mapper in the graphics pipeline according to the invention does not only comprise terms which are constant or only linearly depend on one of the input coordinates, but also has to comprise non-linear or bilinear terms. The introduction of non-linear or bilinear terms enables transforming the axis-aligned input rectangles and the texels therein to arbitrarily shaped output quadrilaterals with realistically transformed texels in screen space 5.

With perspective mapping, axis aligned rectangles in texture space 4 can only be transformed to the quadrilaterals that are observed when viewing the rectangle at another angle. It is impossible to model all 3D objects, using only rectangles. The graphics pipeline according to the invention enables transforming axis aligned rectangles in texture space 4 to arbitrarily shaped quadrilaterals, observed from arbitrarily chosen viewing angles, in screen space 5 without requiring a complex and expensive rasterizer.

For introducing the additional terms, the mapping of equation (1) has to be extended. In matrix form, the extended mapping may, for example, be:

$$\begin{pmatrix} x_c^h \\ y_c^h \\ w_c^h \end{pmatrix} = \begin{pmatrix} A & B & C & D \\ E & F & G & H \\ I & J & K & L \end{pmatrix} \begin{pmatrix} u_g \\ v_g \\ u_g^n v_g^m \\ 1 \end{pmatrix} \quad (3)$$

where n,m∈R. When the function for calculating screen space coordinates comprises at least one product of real powers of the texture space grid coordinates, at least one of the coefficients C, G and K is not equal to zero. Additionally, n and m can not simultaneously be equal to zero and when n or m is equal to zero the other one can not simultaneously be equal to one.

It is to be noted that most modern televisions comprise a video scaler for converting video, images from and to different video formats, e.g. 4:3 and 16:9. Like the rasterizer of the graphics pipeline according to the invention, such video scalers take, rectangular input only (usually the whole image) and map the rectangular input to screen space. Such video scalers can perform a mapping of the form:

$$X = Du|u| + Au + C \quad (2)$$

This equation (2) is used for panoramic mode (when D≠0) or for simple horizontal magnification or minification (when D=0). Such known video scalers are not suited for rendering 3D graphics, because they can not map input rectangles to arbitrarily shaped quadrilaterals.

In a preferred embodiment of the invention, the mapping from world space to texture space is a bilinear mapping (n=m=1) of the form:

$$X(u,v) = a_0 + a_1 u + a_2 v + a_3 uv \quad (4)$$

Some objects, e.g. spheres, cannot be modeled using rectangles only, but such objects can be modeled using arbitrarily shaped quadrilaterals or trapezoids. With a bilinear mapping, planar rectangles and the corresponding texture in texture space can be transformed to arbitrarily shaped quadrilaterals in screen space. As a consequence bilinear mapping may be used for realistically modeling spherical 3D objects.

An additional advantage of using a bilinear mapping is that rectangles in texture space and the corresponding texture can be transformed to non planar quadrilaterals in screen space, resulting in highly realistically models of non planar 3D objects.

DETAILED DESCRIPTION OF THE PREFERRED EMBODIMENT

Figure 1:
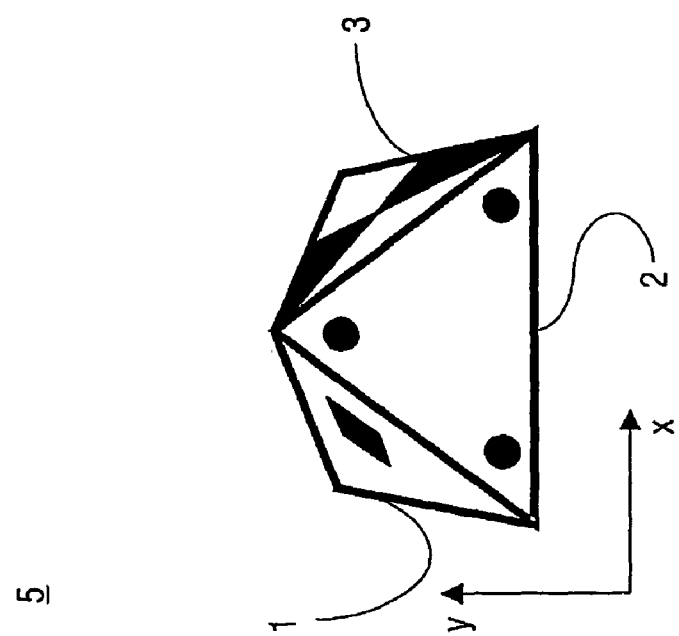
FIG. 1 shows a perspective mapping from texture space to screen space in a prior art 3D graphics pipeline.
Figure 1:
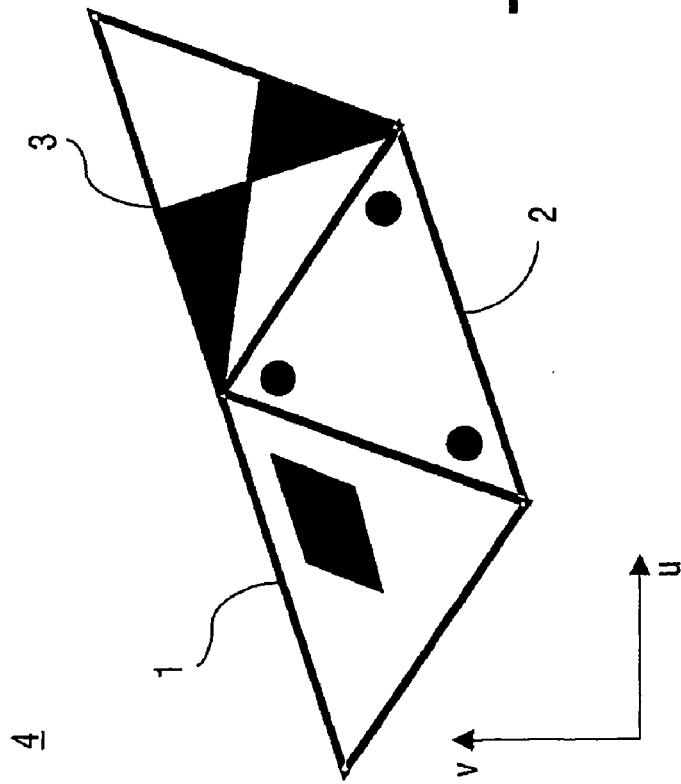
Figure 2:
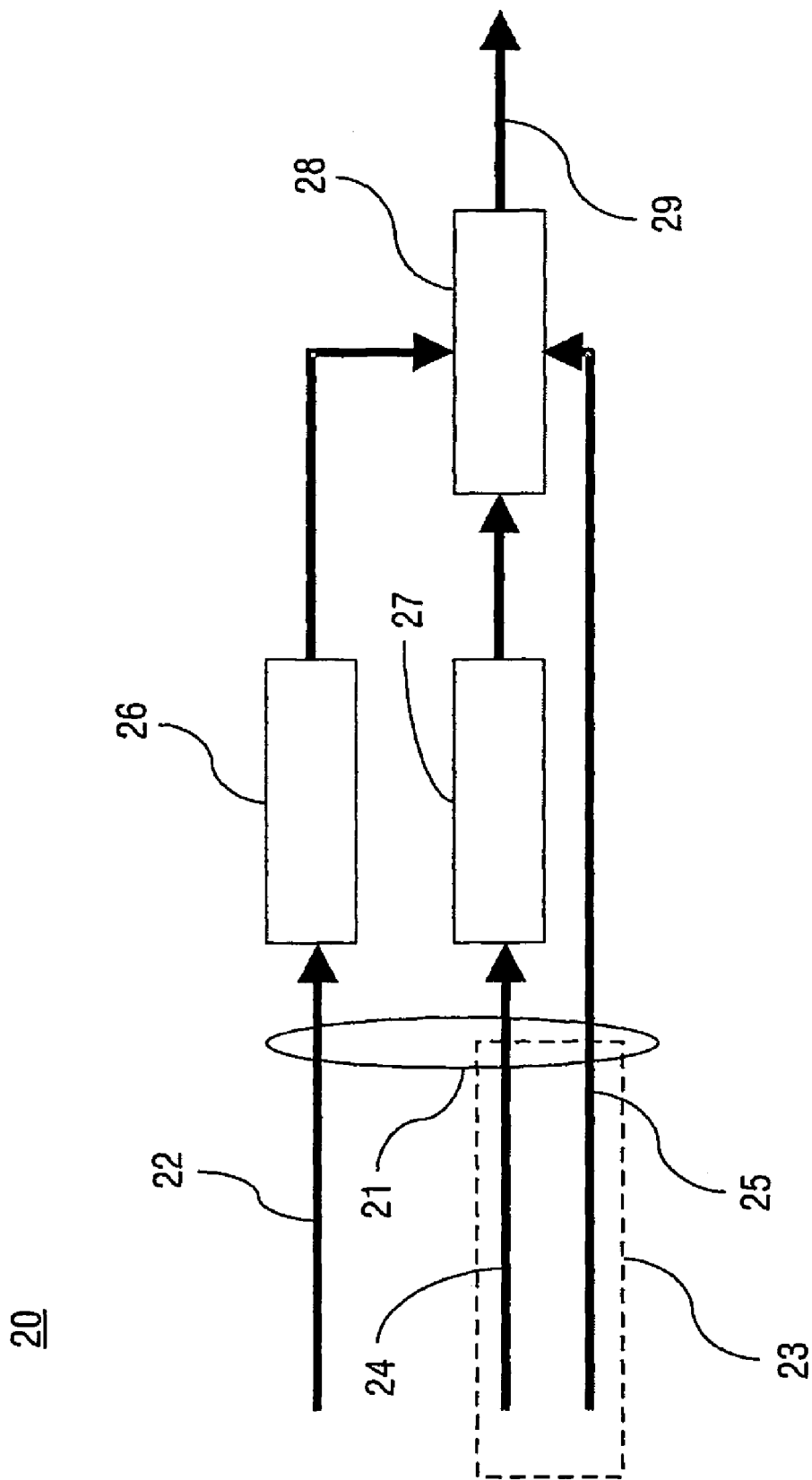
FIG. 2 shows a block diagram of an embodiment of a graphics pipeline according to the invention.

FIG. 2 shows a block diagram of an embodiment of a graphics pipeline 20 according to the invention. The pipeline 20 comprises an input 21 for receiving texture data 22 and vertex data 23. The vertex data 23 comprises texture space input coordinates $(u_r,v_r)$ 24 of input rectangles and screen space input coordinates $(h^h_r,y^h_r,w^h_r)$ 25 of output quadrilaterals. These and other coordinates will further be elucidated hereinafter, referring to FIG. 4. The texture data 22 is stored in texture memory 26. A rasterizer 27 receives the texture space input coordinates $(u_r,v_r)$ 24 of the input rectangles and provides the texture space grid coordinates $(u_g,v_g)$ of the texels inside the input rectangles. The operation of the rasterizer 27 will further be elucidated hereinafter, referring to FIG. 4. A mapper 28 maps the texels inside the input rectangles onto the output quadrilaterals. The mapping is performed by calculation of screen space output coordinates $(x_c,y_c)$ 29 from the texture space grid coordinates $(u_g,v_g)$. The operation of the mapper will further be elucidated hereinafter, referring to FIG. 5.

All elements of the graphics pipeline may be implemented in hardware, for example, as separate elements on a video graphics card for a PC, or as part of a graphics processor unit (GPU). The graphics pipeline may also be implemented in driver software for a video graphics card. Alternatively the graphics pipeline may be implemented in hardware or software elements of a computer display, television, mobile telephone, personal digital assistant (PDA) or other consumer electronic products comprising a display.

Figure 3:
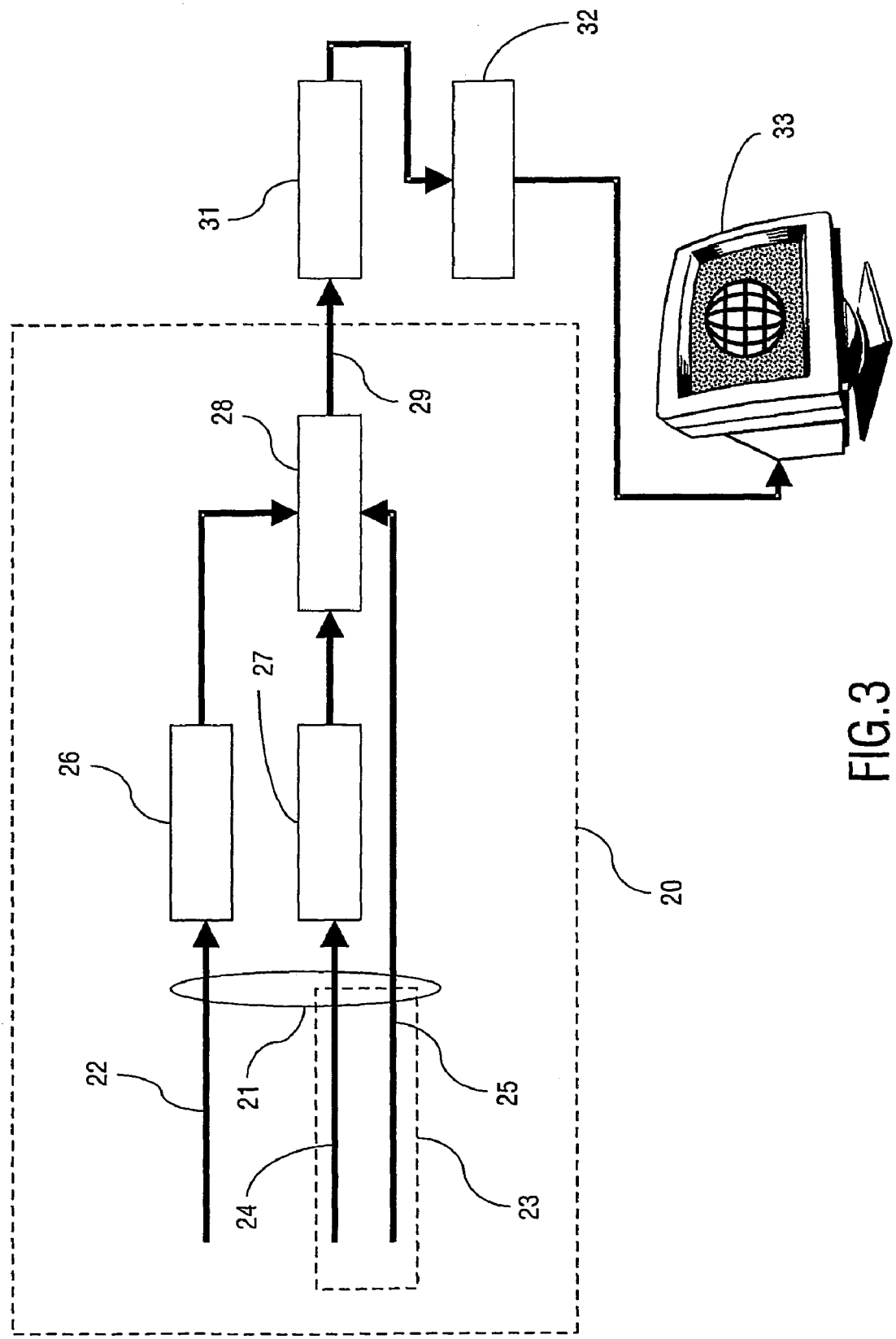
FIG. 3 shows a block diagram of an embodiment of a graphics system in which a graphics pipeline according to the invention may advantageously be used, FIGS. 4A-4C schematically show the rasterizing of an input rectangle in texture space and mapping its texture to screen space.

FIG. 3 shows a block diagram of an example of a graphics system in which a graphics pipeline 20 according to the invention may advantageously be used. The system comprises the graphics pipeline 20, a screen space resampler 31, a frame buffer 32 and a display screen 33. The resampler 31 splats the color of each one of the texels onto pixel positions surrounding the screen space output coordinates $(x_c,y_c)$ 29, which are calculated from the texture space grid coordinates $(u_g,v_g)$ of the corresponding one of the texels. The screen space output coordinates $(x_c,y_c)$ 29 calculated by the mapper need not coincide with pixel positions in screen space. The screen space resampler 31 for each texel calculates the contribution to the color values of the pixel positions in screen space 5 from the screen space output coordinates $(x_c,y_c)$ and the corresponding color. The color values for the whole image are stored in a frame buffer 32. When the color values for all pixels in an image are written to the frame buffer 32, the image may be sent to, for example to a display screen 33 or a beamer for display.

Figures 4A, 4B, 4C:
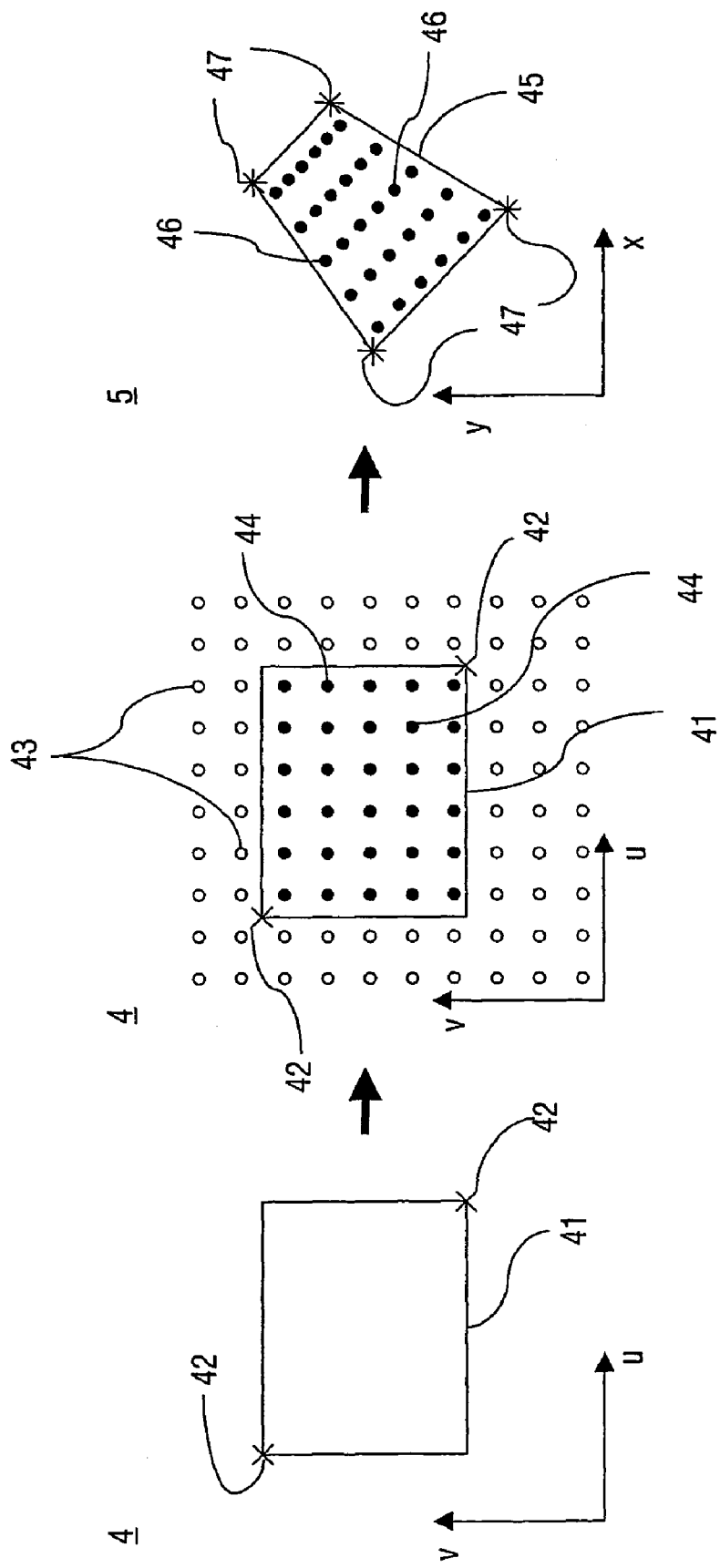

FIGS. 4A-4C schematically show the rasterizing of an input rectangle 41 in texture space 4 and mapping its texture to screen space 5. In FIG. 4A an axis aligned input rectangle 41 in texture space 4, as received at the input 21 of the graphics pipeline 20, is shown. Axis aligned rectangles can be defined by just two coordinate pairs $((u_{r1},v_{r1}), (u_{r2},v_{r2}))$ 42. In FIG. 4B the rasterizing of the axis aligned rectangle 41 is demonstrated. The rectangle 41 is superimposed on a grid. Each grid position 43 may comprise a texture element (texel), which is part of the texture data 22, stored in the texture memory 26. Each texel is associated with texture space grid coordinates $(u_g,v_g)$ and a texture color. Part of the grid positions 43 are outside the rectangle 41. Other grid positions are inside the rectangle 41 and comprise the texels 44 to be mapped. The rasterizer determines which texels 44 are inside the rectangle 41.

After rasterization the rectangle 41 is mapped to an output quadrilateral in screen space 5 by the mapper 28. FIG. 4C shows a mapped quadrilateral 45 in screen space 5. The mapper 28 first calculates the mapping coefficients A-L (see equation (3)), using the texture space input coordinates $(u_r,v_r)$ 42 of the input rectangle 41 and screen space input coordinates $(x^h_r,y^h_r,w^h_r)$ 47 of the output quadrilateral 45. When the mapping coefficients are known, all texels 44 inside the input rectangle 41 are mapped onto the output quadrilateral 45. The screen space output coordinates $(x_c,y_c)$ of the mapped texels 46 are calculated using a mapping function, like the one in equation (3). First the homogeneous coordinate $x^h_c$ is calculated which still has to undergo division by the third coordinate $(w^h_c)$ to arrive at the actual screen space output coordinate $x_c$. Then $y_c$ is calculated from the calculated output coordinate $x_c$ and the input coordinate $v_g$. In a preferred embodiment of the invention, the mapping from texture space to screen space is a bilinear mapping (n=m=1). If the mapping is bilinear, $x_c$ and $y_c$ are calculated using the following equations:

$$x_c = \frac{x^h_c}{w^h_c} = \frac{Au_g + Bv_g + Cu_gv_g + D}{Iu_g + Jv_g + Ku_gv_g + L} \tag{5}$$

$$y_c = \frac{p_0(v_g) + p_1(v_g)x_c}{p_2(v_g)} \tag{6}$$

where $$p_0(v_g) = (AH - DE) + (AF - BE + CH - DG)v_g + (CF - BG)v_g^2 \tag{7}$$
$$p_1(v_g) = (EL - HI) + (EJ - FI + GL - HK)v_g + (GJ - FK)v_g^2$$
$$p_2(v_g) = (AL - DI) + (AJ - BI + CL - DK)v_g + (CJ - BK)v_g^2$$

The color values for the mapped texels 46 are retrieved from the texture memory 26.

Figure 5B:
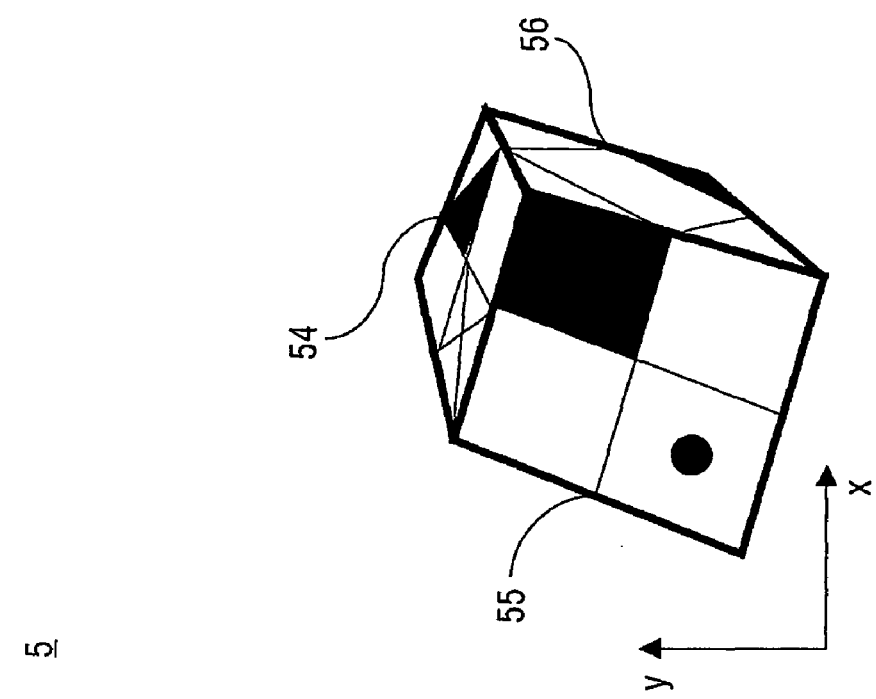
FIGS. 5A and 5B show a mapping from texture space to screen space in a 3D graphics pipeline according to the invention.
Figure 5A:
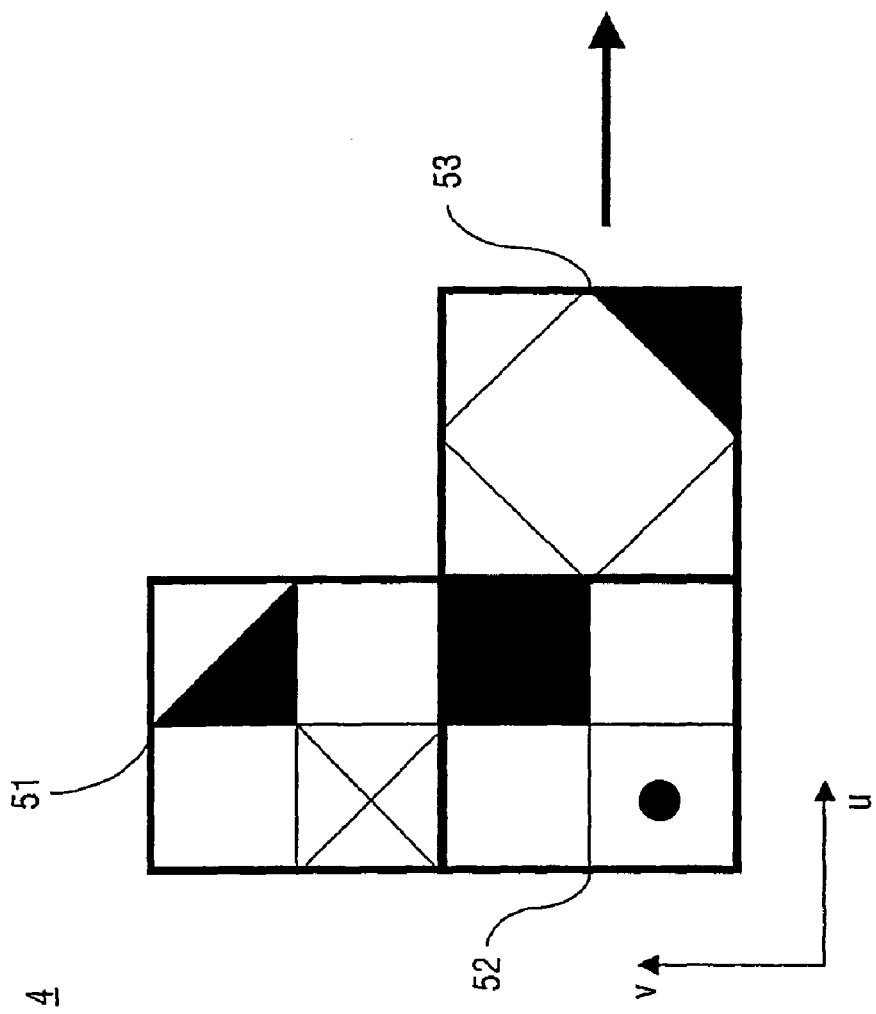

FIGS. 5A and 5B show a mapping from texture space to screen space in a 3D graphics pipeline according to the invention. FIG. 5A shows an object in texture space 4. The texture of the object consists of three axis-aligned rectangles 51, 52 and 53. The mapper, maps the rectangles 51, 52 and 53 to arbitrarily shaped quadrilaterals 54, 55 and 56 in screen space 5 (FIG. 5B). The 3D object shown in FIG. 5B is a distorted cube. The quadrilaterals 54, 55 and 56 are a 2D representation of non-rectangular quadrilaterals in the 3D world, as observed from a certain viewing point. Each quadrilateral is observed from a different viewing angle, because each quadrilateral has a different orientation relative to the viewing point.

Figure 6B:
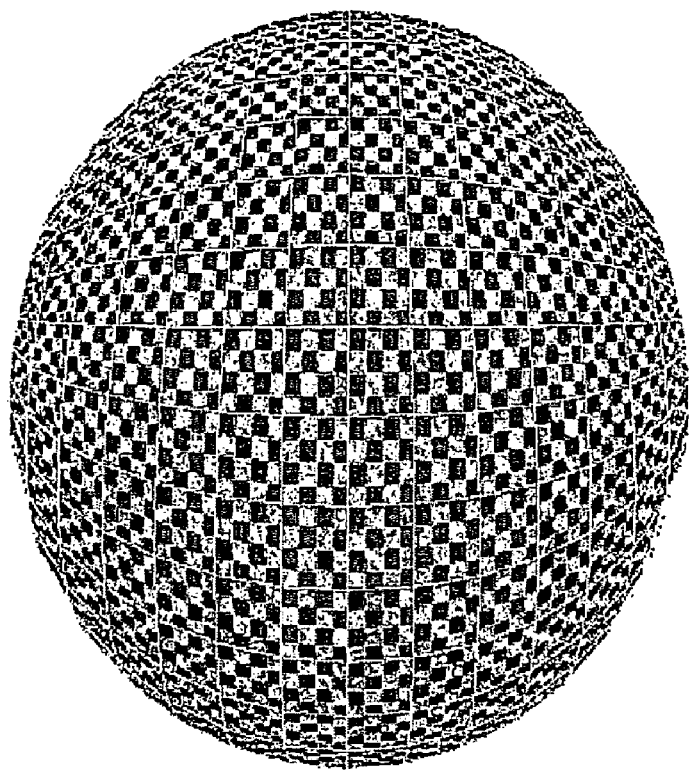
FIGS. 6A and 6B show a 2D representation of a sphere, obtained from a graphics pipeline according to the invention.
Figure 6A:
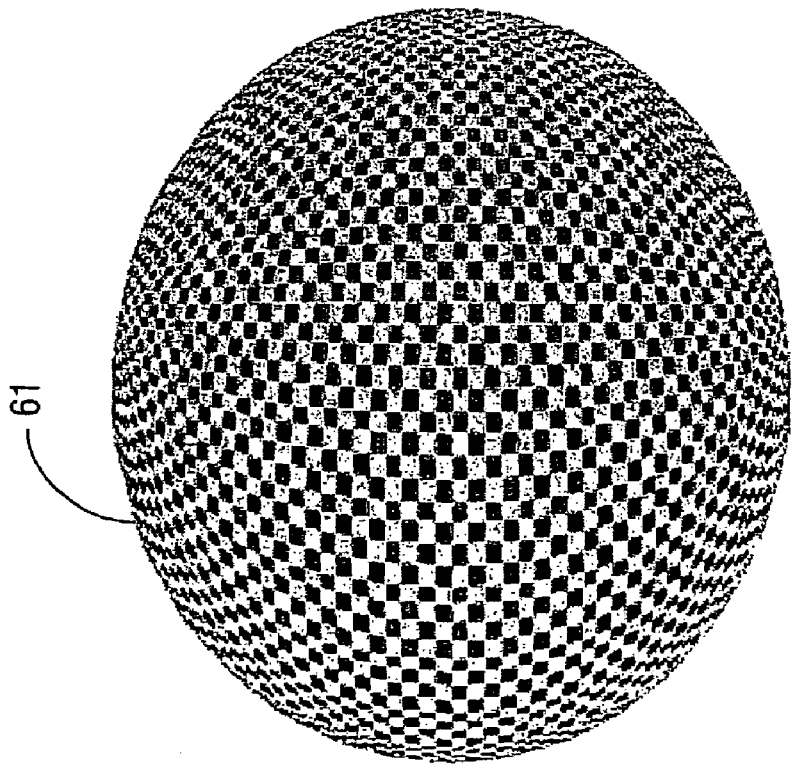

FIGS. 6A and 6B show a 2D representation of a 3D sphere, obtained from a graphics pipeline according to the invention. In FIG. 6A the 2D representation 61 in screen space is shown. The output quadrilaterals in screen space result from mapping axis-aligned input rectangles in texture space. In FIG. 6B the output quadrilaterals have a white border for enabling distinction of the individual quadrilaterals.

It should be mentioned that the above-described embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A graphics pipeline for rendering graphics using forward texture mapping, the pipeline comprising:
    an input for receiving texture data and vertex data, the texture data defining texture maps in a texture space, each texture map comprising texels associated with texture space grid coordinates $(u_g, v_g)$, the vertex data comprising texture space input coordinates $(u_r, v_r)$ of input rectangles and screen space input coordinates $(x^h_r, y^h_r, w^h_r)$ of output quadrilaterals, the input rectangles being axis-aligned in the texture space, each one of the input rectangles being associated with a corresponding one of the output quadrilaterals;
    a rasterizer for receiving the texture space input coordinates of the input rectangles and for providing the texture space grid coordinates of the texels inside the input rectangles; and
    a mapper for mapping the texels inside the input rectangles onto the output quadrilaterals, the mapping being performed by calculating screen space output coordinates $(x_c, y_c)$ from the texture space grid coordinates of the texels and the screen space input coordinates of the output quadrilaterals using a mapping function comprising at least one linear combination of the texture space grid coordinates of the texels inside the input rectangles, and at least one product of real powers $(u_g^n v_g^m \; n,m \in R)$ of the texture space grid coordinates of the texels inside the input rectangles;
    wherein the graphics pipeline renders graphics using forward texture mapping.

2. A graphics pipeline as claimed in claim 1, wherein the real powers are natural powers.

3. A graphics pipeline as claimed in claim 2, wherein the natural powers are equal to one.

4. A graphics pipeline as claimed in claim 1, further comprising a screen space resampler for splatting a color of each one of the texels onto pixel positions surrounding the screen space output coordinates which are calculated from the texture space grid coordinates of the corresponding one of the texels.

5. A method for rendering graphics using forward texture mapping to be displayed on a display, the method comprising:
    receiving, using an input, texture data and vertex data, the texture data defining texture maps in a texture space, each texture map comprising texels associated with texture space grid coordinates $(u_g, v_g)$, the vertex data comprising texture space input coordinates $(u_r, y_r)$ of input rectangles and screen space input coordinates $(x^h_r, y^h_r, w^h_r)$ of output quadrilaterals, the input rectangles being axis-aligned in the texture space, each one of the input rectangles being associated with a corresponding one of the output quadrilaterals;
    providing, using a rasterizer, the texture space grid coordinates of the texels inside the input rectangles from the texture space input coordinates of the input rectangles; and
    mapping, using a mapper, the texels inside the input rectangles onto the output quadrilaterals, the mapping being performed by calculating screen space output coordinates $(x_c, y_c)$ from the texture space grid coordinates of the texels and the screen space input coordinates of the output quadrilaterals using a mapping function comprising at least one linear combination of the texture space grid coordinates of the texels inside the input rectangles, and at least one product of real powers $(u_g^n v_g^m \; n,m \in R)$ of the texture space grid coordinates of the texels inside the input rectangles;
    wherein the graphics are rendered using forward texture mapping.

6. A computer comprising a graphics pipeline as claimed in claim 1.

7. A device for displaying graphics, the device comprising:
    a graphics pipeline as claimed in claim 1, and
    a display for displaying the graphics rendered by the pipeline.

8. The graphics pipeline as claimed in claim 1 wherein the screen space input coordinates $(x^h_r, y^h_r, w^h_r)$ is a product of a mapping coefficient matrix and a column vector.

9. The graphics pipeline as claimed in claim 8 wherein the mapping coefficients are determined as a function of texture space input coordinates of an input rectangle, and screen space output coordinates of an output quadrilateral.

10. The graphics pipeline as claimed in claim 8 wherein the column vector comprises the texture space grid coordinates of the texels inside the input matrix, a product of real powers of the texture space grid coordinates of the texels inside the input matrix, and a constant element.

11. The graphics pipeline as claimed in claim 2 wherein the screen space input coordinates $(x^h_r, y^h_r, w^h_r)$ is a product of a mapping coefficient matrix and a column vector.

12. The graphics pipeline as claimed in claim 11 wherein the mapping coefficients are determined as a function of texture space input coordinates of an input rectangle, and screen space output coordinates of an output quadrilateral.

13. The graphics pipeline as claimed in claim 11 wherein the column vector comprises the texture space grid coordinates of the texels inside the input matrix, a product of real powers of the texture space grid coordinates of the texels inside the input matrix, and a constant element.

14. The graphics pipeline as claimed in claim 3 wherein the screen space input coordinates $(x^h_r, y^h_r, w^h_r)$ is a product of a mapping coefficient matrix and a column vector.

15. The graphics pipeline as claimed in claim 14 wherein the mapping coefficients are determined as a function of texture space input coordinates of an input rectangle, and screen space output coordinates of an output quadrilateral.

16. The graphics pipeline as claimed in claim 14 wherein the column vector comprises the texture space grid coordinates of the texels inside the input matrix, a product of real powers of the texture space grid coordinates of the texels inside the input matrix, and a constant element.

17. The graphics pipeline as claimed in claim 4 wherein the screen space input coordinates $(x^h_r, y^h_r, w^h_r)$ is a product of a mapping coefficient matrix and a column vector.

18. The graphics pipeline as claimed in claim 17 wherein the column vector comprises the texture space grid coordinates of the texels inside the input matrix, a product of real powers of the texture space grid coordinates of the texels inside the input matrix, and a constant element.

19. The method of claim 5 wherein the screen space input coordinates $(x^h_r, y^h_r, w^h_r)$ is a product of a mapping coefficient matrix and a column vector.

20. The method of claim 19 wherein the column vector comprises the texture space grid coordinates of the texels inside the input matrix, a product of real powers of the texture space grid coordinates of the texels inside the input matrix, and a constant element.

* * * * *